United States Patent
Betensky

4,017,160
Apr. 12, 1977

[54] CONTINUOUSLY VARIABLE ANAMORPHIC LENS

[75] Inventor: Ellis I. Betensky, Toronto, Canada

[73] Assignee: Minnesota Mining and Manufacturing Company, St. Paul, Minn.

[22] Filed: Sept. 19, 1975

[21] Appl. No.: 614,900

[52] U.S. Cl. .............................. 350/182; 350/185; 350/215

[51] Int. Cl.² ........................................ G02B 13/10

[58] Field of Search .................. 350/182, 185, 215

[56] References Cited
UNITED STATES PATENTS 3,497,289  2/1970  Oberheuser .................... 350/182

*Primary Examiner*—Paul A. Sacher
*Assistant Examiner*—Conrad Clark
*Attorney, Agent, or Firm*—Cruzan Alexander; Donald M. Sell; Philip A. Dalton, Jr.

[57] ABSTRACT

A continuously variable anamorphic lens containing two sets of four elements between which is placed two achromatized prisms. The anamorphic magnification is varied by the tilting of the prisms.

3 Claims, 18 Drawing Figures

CONTINUOUSLY VARIABLE ANAMORPHIC LENS

FIELD OF THE INVENTION

The present invention relates to an anamorphic imaging lens for use at finite magnifications in which the anamorphic magnification is continuously variable.

BACKGROUND OF THE INVENTION

Anamorphic optical systems provide different magnifications in mutually perpendicular planes containing the optical axis. They can be utilized for special purposes to impart a deliberate and controlled degree of distortion in optical images. Anamorphic systems are not new, in fact the Patent literature goes back at least as far as 1898 when British Pat. No. 8512 disclosed achromatization of prism type anamorphs. In 1929 the French Scientist Henri Chretien demonstrated a system for motion pictures in which a very wide picture was compressed laterally in the camera by means of a cylindrical lens arrangement. On subsequent projection the image was expanded laterally by means of a similar type lens. In this case an object with an aspect ratio of 2.6:1 could be recorded in a normal motion picture camera equipped with an imaging system capable of handling a 2:1 aspect ratio. The system was first used commercially by Twentieth-Century Fox in 1952 and is generally known as the "Cinemascope" system.

There are two main types of anamorphic systems, the prismatic and the cylindrical forms. The prismatic type of anamorph depends for its action upon the compression of a beam of light as it passes through a prism. If the width of the entering beam is D and that of the emergent beam is $D_1$, then the magnification ratio M is equal to $D_1/D$. This is also equal to the magnification ratio of the prism. If the angle between the two beams when they enter the prism is A then the angle between the emergent beams is M times A. If a prism is used in a position decidedly away from the minimum deviation condition, the emergent beam will be either broader or narrower than the entering beam. If two prisms are utilized the deviation of light by one prism is rectified by the other, but each prism contributes its share to the anamorphic compression. Axial rays emerge from the system parallel to their direction of incidence.

In an actual system where spherical lenses are incorporated it is necessary to compensate for optical aberrations. Each prism set is thus achromatized by using two or more elements of different materials. Prism anamorphs are free from axial astigmatism, but only when used in parallel light.

The cylindrical type of anamorphic attachment assumes, in its simplest form, two cylindrical lenses. In practice it is necessary to achromatize the positive and negative cylindrical lenses. This is effected by combining different types of glass in each component in the same way that lenses with spherical surfaces are achromatized by using crown and flint glass. The axes of the various cylindrical surfaces must be precisely aligned to prevent astigmatism so that a sharp focus can be obtained.

Anamorphic optical systems in which the magnifications in mutually perpendicular planes containing the optical axis are different are thus not new. Their application has however been severely limited by the difficulties in applying routine lens design procedures to the unusual and asymmetric conditions which they must assume. In addition, the problems of manufacturing these lenses, which contain either prisms or cylinders are considerable.

In the printing industry it is desirable to reduce the size of an object in one direction while maintaining the same size in a mutually orthogonal direction. This change in the proportions of the image can be used to fit varying originals into a common printing format or to reduce paper consumption. In doing this no appreciable loss of image quality can be tolerated particularly with respect to imaging points, such as half tone dots. Systems have been proposed and are indeed being used at the present time. However, these systems usually take the form of attachments to conventional lenses. Such attachments substantially degrade image quality and are not normally capable of operation at more than one anamorphic magnification and even under these conditions refocusing is required.

SUMMARY OF THE INVENTION

According to the present invention there is provided a continuously variable anamorphic lens which does not require movement of the lens or changing of elements to vary the anamorphic magnification. The lens comprises a four element front lens group for collimating light, a four element rear lens group for decollimating light, a pair of achromatized prisms between said front and rear groups, said prisms being pivotable about parallel axes perpendicular to the axis of the lens, and means for pivoting the prisms in a predetermined relationship. The front and rear lens groups cooperate with the prisms to provide a primary magnification of from 0.8 to 1.2 and a continuously variable anamorphic magnification of from 0.9 to 1.0.

THE DRAWING

Figure 7:
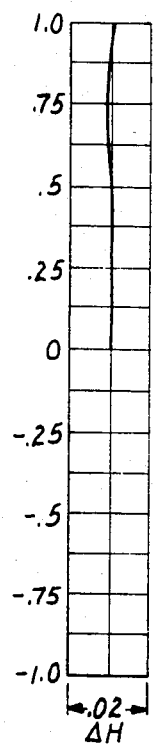
Figure 8:
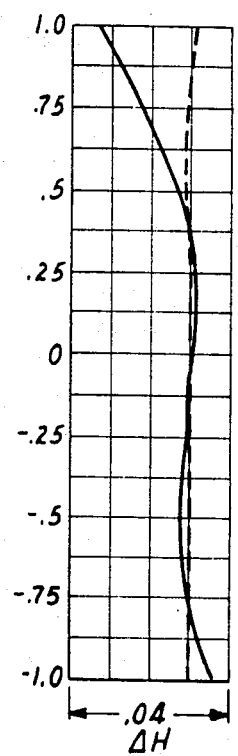
Figure 9:
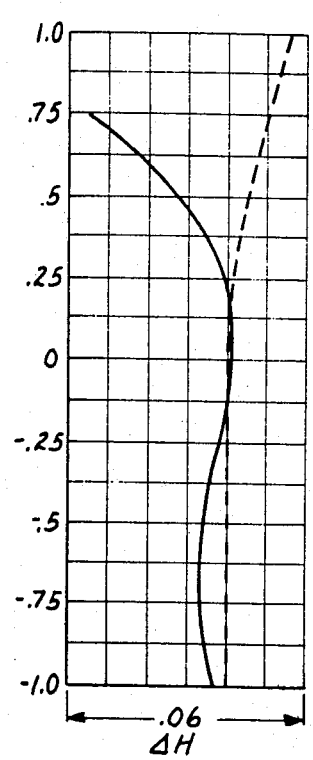
Figure 10:
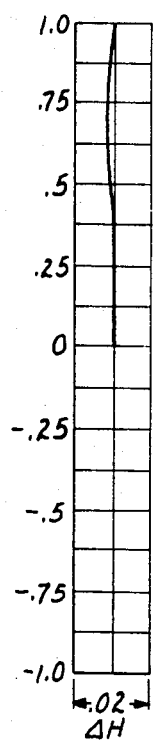
Figure 11:
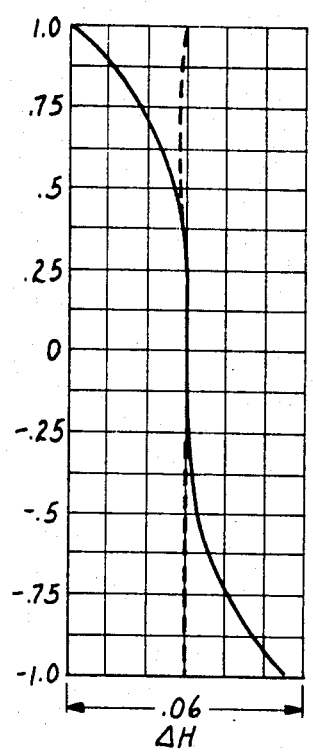
Figure 12:
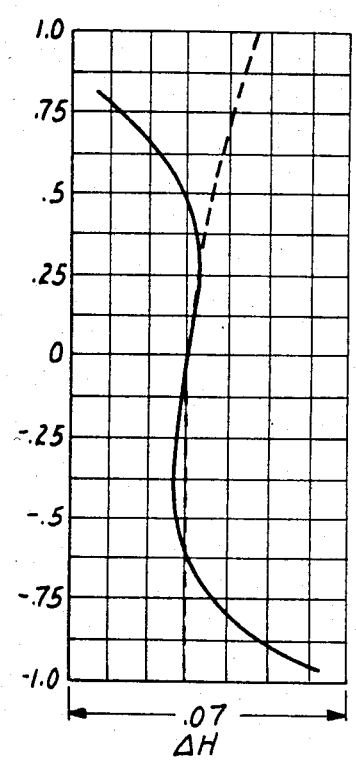

FIGS. 7, 8 and 9 are tangential and sagittal oblique ray intercept curves for the upper field along the axis and through 70 percent and 100 percent, respectively, of the field of view at an anamorphic magnification of 1.0;

FIGS. 10, 11 and 12 are tangential and sagittal oblique ray intercept curves for the lower field along the axis and through 70 percent and 100 percent, respectively, of the field of view at an anamorphic magnification of 1.0.

Figure 13:
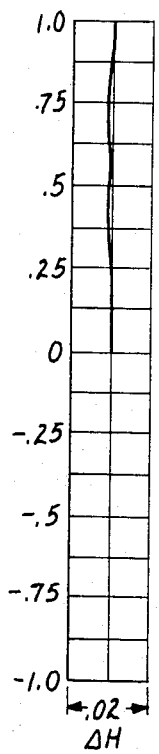
Figure 14:
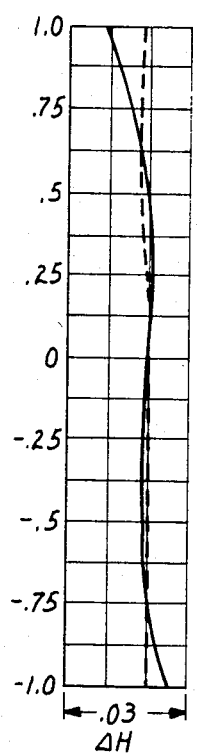
Figure 15:
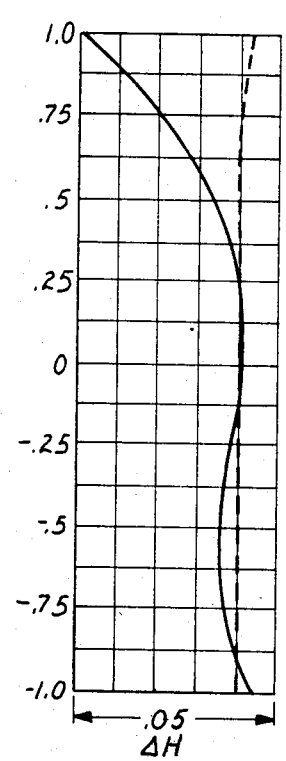
Figure 16:
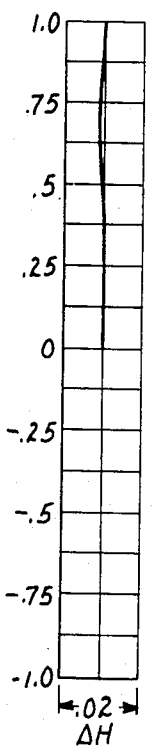
Figure 17:
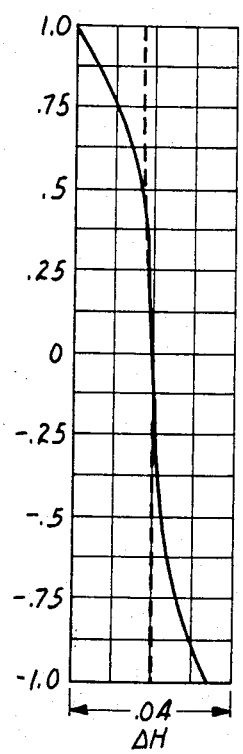
Figure 18:
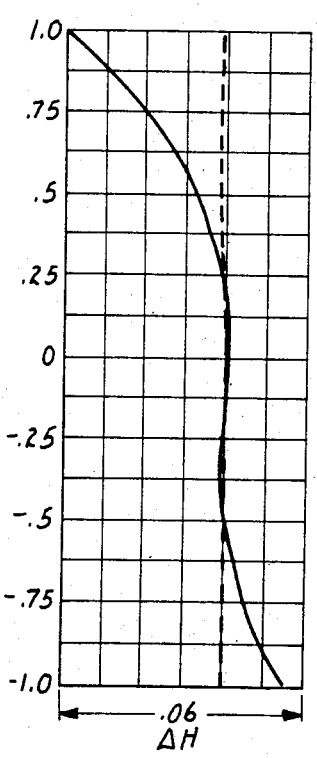

FIGS. 13, 14 and 15 are curves similar to those of FIGS. 7, 8 and 9, respectively, at an anamorphic magnification of 0.92; and FIGS. 16, 17 and 18 are curves similar to those of FIGS. 10, 11 and 12, respectively, at an anamorphic magnification of 0.92.

The lens of the present invention comprises a four element front lens group for collimating light and consisting of lens elements 1, 2, 3 and 4, a four element rear lens group for decollimating light and consisting of lens elements 9, 10, 11 and 12 and a pair of achromatized two element prisms consisting of lens elements 5, 6 and 7, 8, which prisms are positioned between the front and rear lens groups.

Numerical data for constructing an anamorphic lens according to the invention is given in the following table in which the lens elements are numbered from front to rear, N is the index of refraction of the lens elements for the Sodium $d$ line, V is the index of dispersion, and R, $t$ and $s$ refer, respectively to the radii of curvature of the lens surfaces, the axial thickness of the lens elements and the air spaces between the elements, numbered by subscript from front to rear. The plus and minus values of the radii, R, denote surfaces that are, respectively, convex and concave.

| ELEMENT NO | $N_d$ | V | RADII (m.m.) | THICKNESSES & SPACINGS (m.m.) |
|---|---|---|---|---|
| 1 | 1.589 | 61.27 | $R_1=+96.000$ | $t_1=22.66$ |
|   |       |       | $R_2=+301.000$ | |
| 2 | 1.548 | 45.75 | $R_3=-301.000$ | $t_2=5.80$ |
|   |       |       | $R_4=-90.900$ | $s_1=7.39$ |
| 3 | 1.740 | 28.20 | $R_5=+145.812$ | $t_3=4.50$ |
|   |       |       | $R_6=-58.250$ | $s_2=1.39$ |
| 4 | 1.755 | 27.58 | $R_7=+61.303$ | $t_4=6.50$ |
|   |       |       | $R_8=-166.300$ | $s_3=7.94$ |
| 5 | 1.589 | 61.27 | $R_9=\infty$ | $t_5=6.60$ |
|   |       |       | $R_{10}=\infty$ | |
| 6 | 1.620 | 36.37 | $R_{11}=\infty$ | $t_6=4.10$ |
|   |       |       | $R_{12}=\infty$ | $s_4=6.20$ |
| STOP (at surface 12) | | | | |
| 7 | 1.620 | 36.37 | $R_{13}=\infty$ | $t_7=5.44$ |
|   |       |       | $R_{14}=\infty$ | |
| 8 | 1.589 | 61.27 | $R_{15}=\infty$ | $t_8=8.60$ |
|   |       |       | $R_{16}=\infty$ | $s_5=6.38$ |
| 9 | 1.755 | 27.58 | $R_{17}=-166.30$ | $t_9=6.50$ |
|   |       |       | $R_{18}=+61.303$ | $s_6=1.39$ |
| 10 | 1.740 | 28.20 | $R_{19}=-58.250$ | $t_{10}=4.50$ |
|    |       |       | $R_{20}=+145.812$ | $s_7=7.39$ |
| 11 | 1.548 | 45.75 | $R_{21}=-90.900$ | $t_{11}=5.80$ |
|    |       |       | $R_{22}=-301.000$ | |
| 12 | 1.589 | 61.27 | $R_{23}=+301.000$ | $t_{12}=22.66$ |
|    |       |       | $R_{24}=+96.000$ | |

The lens has a nominal equivalent focal length of 482.6 millimeters and a nominal object to image distance of 1942.5 millimeters at unit magnification. At $f/16$ the stop has a diameter of 21.83 millimeters. At unit magnification the lens is designed for an image diagonal of 762 millimeters.

The front prism consisting of lens elements 5 and 6 is supported by a ring 15. The support ring is pivotable about an axis perpendicular to the axis of the lens on two opposed pins 17 and 18 extending from the main lens housing 19. The rear prism consisting of lens elements 7 and 8 is likewise supported by a ring 21 which is pivotable about an axis parallel to the pivot axis of the front prism on a pair of opposed pins (not shown).

A ring-shaped cam 23 is positioned between the two prisms and has forward and rear cam faces 24 and 25. The front and rear prism support rings 15 and 21 carry cam followers 27 and 28, respectively. Cam follower 27 engages the forward cam surface 24 and follower 28 engages the rear cam surface 25. A tension spring between the prism support rings 15 and 21 urges the rings to pivot to engage the cam followers 27 and 28 against the cam surfaces 24 and 25, respectively.

A stop pin 30 extends through a slot 31 in the lens housing 19 and is threaded into the cam. The slot 31 extends 90° around the periphery of the housing 19 in a plane perpendicular to the axis of the lens to permit rotation of the stop pin and the cam 23 therewith through 90°. A guide pin 32 extends from the housing 19 into a circumferential groove in the periphery of the cam 23 to support it and permit rotation about the lens axis.

Figure 1:
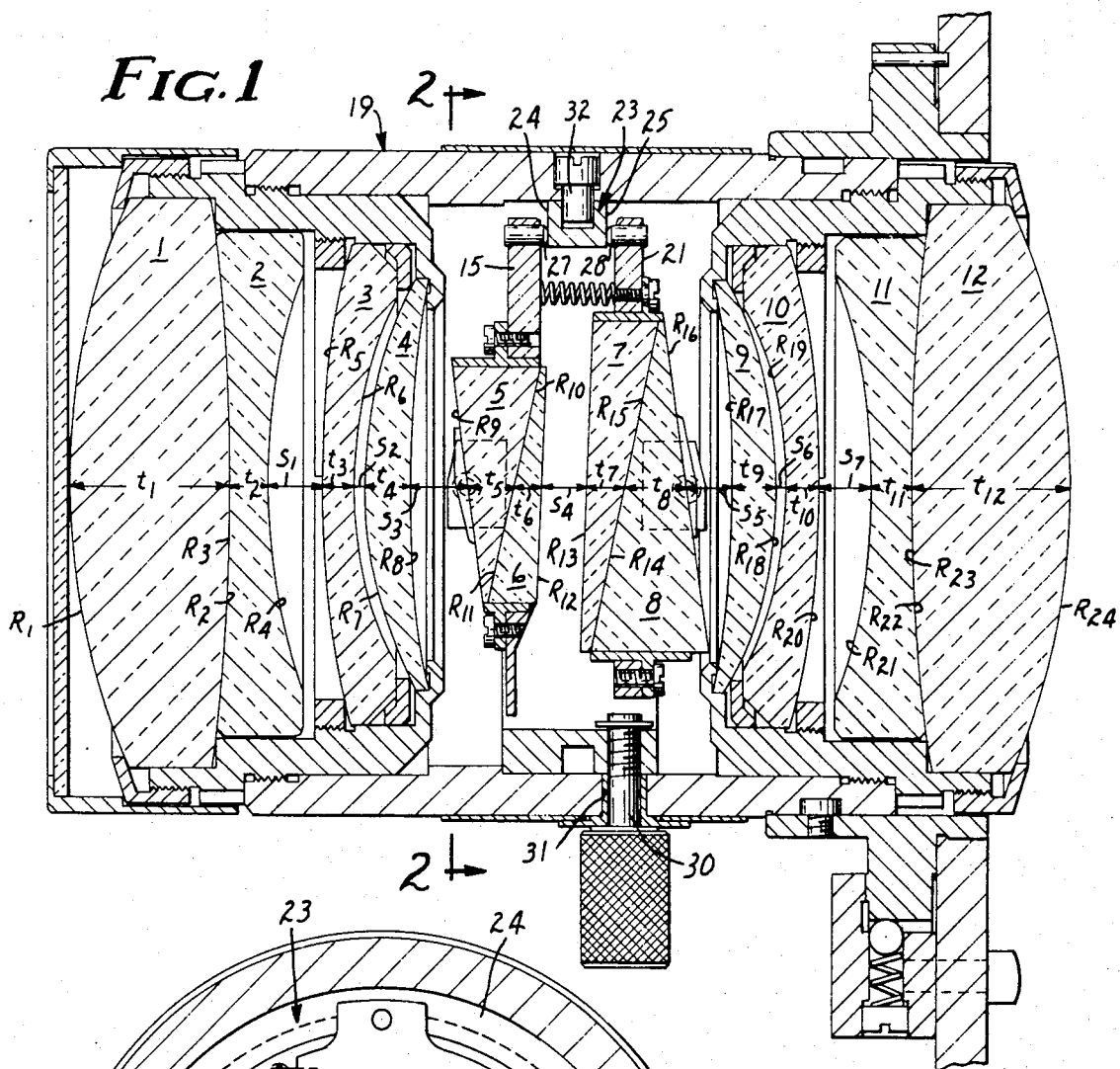
FIG. 1 is a diagrammatic axial cross section of a lens constructed in accordance with the present invention.
Figure 2:
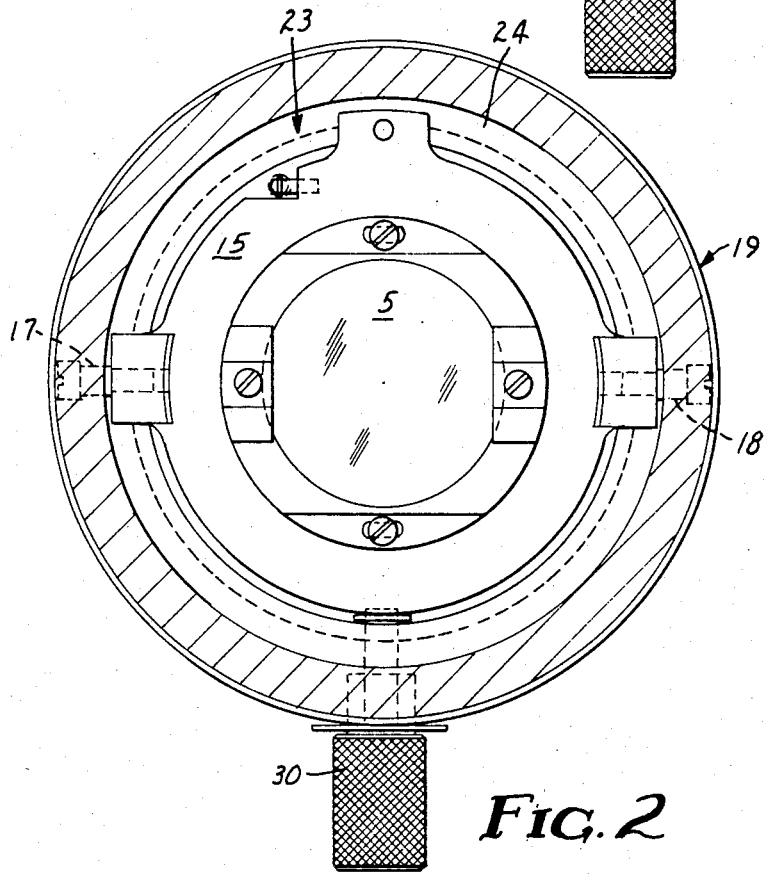
FIG. 2 is a cross-sectional view taken generally along line 2—2 of FIG. 1.

The cam surfaces 24 and 25, through an increase in the axial width of the cam 23, cause pivoting of the prisms as the stop pin 30 and cam 23 therewith are rotated. The position of the prisms illustrated in FIG. 1 is their zero power position. From this position the forward prism is pivoted counterclockwise and the rear prism is pivoted clockwise to vary the anamorphic magnification. At the zero power position the rear surface of the forward prism (surface 12) is at an angle of 2.275° and the forward surface of the rear prism (surface 13) is also at an angle of 2.275° clockwise from the vertical. The cam 23 provides a linear relationship of pivoting between the prisms as the anamorphic magnification is increased. At the furthest excursion of the cam the anamorphic magnification is 0.92, the rear surface of the front prism (surface 12) is at an angle of 10.135° counterclockwise from the vertical and the front surface of the rear prism (surface 13) is at an angle of 15.749° clockwise from the vertical.

At unit primary magnification the nominal distance from the object plane to the front surface of lens element 1 is 900.4 millimeters. In addition, the lens is also suitable for use at other primary magnifications between 0.8 and 1.2. At 0.8 primary magnification the distance from the object plane to the front surface of lens element 1 is approximately 1021 millimeters and the object to image plane distance is approximately 1967 millimeters while at 1.2 primary magnification the distance from the object plane to the front surface of lens element 1 is approximately 820 millimeters and the object plane to image plane distance is approximately 1960 millimeters. To accomplish this the object plane to image plane distance must be adjusted and in conjunction therewith the lens to object plane distance is adjusted to obtain both the defined magnification and the sharpest image. When the primary magnification has been set the anamorphic magnification can be adjusted without the need to re-focus the lens.

Figure 5:
FIGS. 5 and 6 are, respectively, astigmatism curves for the upper and lower corners of the field for an anamorphic magnification of 0.92.
Figure 3:
FIGS. 3 and 4 are, respectively, astigmatism curves for the upper and lower corners of the field for an anamorphic magnification of 1.0.
Figure 6:
Figure 4:

The graphs of FIGS. 3 through 6 are astigmatism curves for a primary magnification of 1.0. The full lines represent the tangential ray and the broken line represents the sagittal ray. FIGS. 3 and 4 are, respectively, the curves for the upper and lower corners of the field for an anamorphic magnification of 1.0. FIGS. 5 and 6 are, respectively, similar curves for an anamorphic magnification of 0.92. These curves show that the difficult problem of correcting for astigmatism in both the upper and lower fields has been overcome.

The graphs of FIGS. 7 through 12 are tangential and sagittal oblique ray intercept curves for a primary magnification of 1.0. The full lines represent the tangential ray and the broken line represents the sagittal ray. FIGS. 7, 8 and 9 are for the upper field along the axis and through 70 percent and 100 percent, respectively, of the field of view at an anamorphic magnification of 1.0. FIGS. 10, 11 and 12 are curves for the lower field along the axis and through 70 percent and 100 percent, respectively, of the field of view at an anamorphic magnification of 1.0. FIGS. 13, 14 and 15 are curves similar to those of FIGS. 7, 8 and 9, respectively, at an anamorphic magnification of 0.92. FIGS. 16, 17 and 18 are curves similar to those of FIGS. 10, 11 and 12, respectively, at an anamophic magnification of 0.92.

The curves of FIGS. 7 through 18 show that the lens quadrants are quite symmetrical in performance and that a high degree of correction has been achieved. In particular the aberrational correction permits a modulation of at least twenty-five percent at 15 cycles per millimeter to be maintained over the entire field at all anamorphic magnifications.

I claim:

1. A continuously variable anamorphic lens comprising:
    a four element front lens group for collimating light,
    a four element rear lens group for decollimating light,
    a pair of achromatized prisms between said front and rear groups, said prisms being pivotable about parallel axes perpendicular to the axis of the lens, and
    means for pivoting said prisms in a predetermined relationship,
    said front and rear lens groups cooperating with said prisms to provide a primary magnification of from 0.8 to 1.2 and a continuously variable anamorphic magnification of from 0.9 to 1.0.

2. The lens of claim 1 wherein the elements of said front lens group are from front to rear a double convex lens element cemented to a double concave lens element, a concave meniscus lens element and a convex meniscus and wherein the elements of said rear lens group are from front to rear a convex meniscus lens element, a concave meniscus lens element and a double concave lens element cemented to a double convex lens element.

3. The lens of claim 2 wherein the lens elements have substantially the following characteristics and spatial relations in which the lens elements are numbered from front to rear, $N_d$ is the index of refraction of the lens elements for the Sodium $d$ line, V is the index of dispersion, and R, $t$ and $s$ refer, respectively to the radii of curvature of the lens surfaces, the axial thickness of the lens elements and the air spaces between the elements, numbered by subscript from front to rear, the plus and minus values of the radii, R, denoting surfaces that are, respectively, convex and concave:

| ELEMENT NO | $N_d$ | V | RADII (m.m.) | THICKNESSES & SPACINGS (m.m.) |
|---|---|---|---|---|
| 1 | 1.589 | 61.27 | $R_1=+96.000$ $R_2=+301.000$ | $t_1=22.66$ |
| 2 | 1.548 | 45.75 | $R_3=-301.000$ $R_4=-90.900$ | $t_2=5.80$ $s_1=7.39$ |
| 3 | 1.740 | 28.20 | $R_5=+145.812$ $R_6=-58.250$ | $t_3=4.50$ $s_2=1.39$ |
| 4 | 1.755 | 27.58 | $R_7=+61.303$ $R_8=-166.300$ | $t_4=6.50$ $s_3=7.94$ |
| 5 | 1.589 | 61.27 | $R_9=$ $R_{10}=$ | $t_5=6.60$ |
| 6 | 1.620 | 36.37 | $R_{11}=$ $R_{12}=$ | $t_6=4.10$ $s_4=6.20$ |
| STOP (At surface 12) | | | | |
| 7 | 1.620 | 36.37 | $R_{13}=$ $R_{14}=$ | $t_7=5.44$ |
| 8 | 1.589 | 61.27 | $R_{15}=$ $R_{16}=$ | $t_8=8.60$ $s_5=6.38$ |
| 9 | 1.755 | 27.58 | $R_{17}=-166.30$ $R_{18}=+61.303$ | $t_9=6.50$ $s_6=1.39$ |
| 10 | 1.740 | 28.20 | $R_{19}=-58.250$ $R_{20}=+145.812$ | $t_{10}=4.50$ $s_7=7.39$ |
| 11 | 1.548 | 45.75 | $R_{21}=-90.900$ $R_{22}=-301.000$ | $t_{11}=5.80$ |
| 12 | 1.589 | 61.27 | $R_{23}=+301.000$ $R_{24}=+96.000$ | $t_{12}=22.66$ |

* * * * *